Sept. 4, 1956    B. C. FINN    2,761,334
WORK HOLDING AND TILTING DEVICE
Filed July 20, 1953    2 Sheets-Sheet 1

INVENTOR.
BURTON C. FINN
BY
ATTORNEY

Sept. 4, 1956

B. C. FINN 2,761,334

WORK HOLDING AND TILTING DEVICE

Filed July 20, 1953

INVENTOR.
BURTON C. FINN

BY

ATTORNEY

United States Patent Office 2,761,334
Patented Sept. 4, 1956

2,761,334

WORK HOLDING AND TILTING DEVICE

Burton C. Finn, Austell, Ga.

Application July 20, 1953, Serial No. 368,873

1 Claim. (Cl. 77—62)

This invention relates to a work holding and tilting device and more particularly to a device which will hold a piece of work in a tightened predetermined position, then allow it to be tilted whereby the work clamping means holding the work is automatically loosened as the axis thereof is changed.

In drilling and tapping operations, according to prior art methods, a piece of work is clamped in position beneath a drill press or the like, the work usually being held by a stationary collet by means of which the work is clamped or unclamped. In this type of apparatus, the drill must be withdrawn from the proximity of the work before the work is removed from the collet, since, generally speaking, the work is removed by moving it toward the drill. In mass production, the process described above is extremely time consuming which, in turn, makes the finished product unduly expensive.

Briefly, my device comprises a work holding member such as a collet, carried by a tiltable closure member having an adjustable cap. A sleeve or collet operating member, mounted between the closure member and the collet, is actuated axially with respect to the closure member and collet by pivoting the closure member and thus positioning one end of the sleeve in a different location with respect to a camming member on which the closure member is pivoted. The sleeve thus acts as a camming member and in combination with the adjustable cap causes the jaws of the collet to be actuated, thereby closing the jaws when the closure member is in the upright position and allowing the jaws to open when the closure member is in the tilted position.

My work holding and tilting device is usually mounted on the work bench or plate of a drill press or the like, even though it may be adapted to such devices as lathes, milling machines and other similar machines capable of doing tapping, threading, drilling and similar work. Further, my device is particularly adapted for use where there is a minimum of clearance for setting up the spindle, chuck or bit of a machine with reference to the work.

Accordingly, it is an object of my invention to provide a work holding and tilting device which will retain a piece of work in a predetermined position below a tool holder of a machine tool in such a way that by simple actuation of the tilting fixture, the work will be simultaneously moved from alignment with the axis of the spindle and released to be replaced by a similar piece of work which is returned to the same position as the previous piece of work.

Another object of my invention is to provide a work holding and tilting device capable of successively positioning a plurality of similar articles in a predetermined position so that work may be done on these articles.

Another object of my invention is to provide a means by which an elongated piece of material may be clamped in a collet which is aligned with a drill in such a way that the piece of work may be removed from the collet without removing the drill from close proximity with the collet.

Another object of my invention is to provide a work holding and tilting device which is efficient in operation, durable in structure, economical to manufacture, and which has few moving parts to get out of adjustment.

Other and further objects and advantages of my invention will become apparent from the following description when taken in conjunction with the accompanying drawings wherein like characters of reference designate corresponding parts throughout the several views, and wherein.

Figure 3:
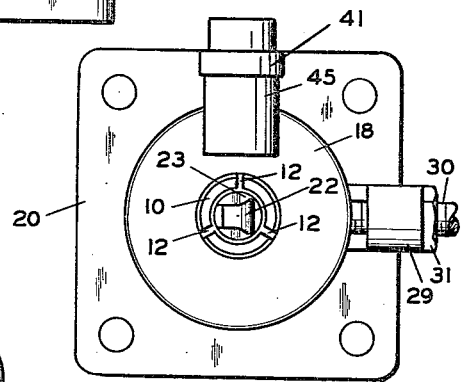
Fig. 3 is a cross-sectional view taken along line 3—3 in Fig. 2.
Figure 2:
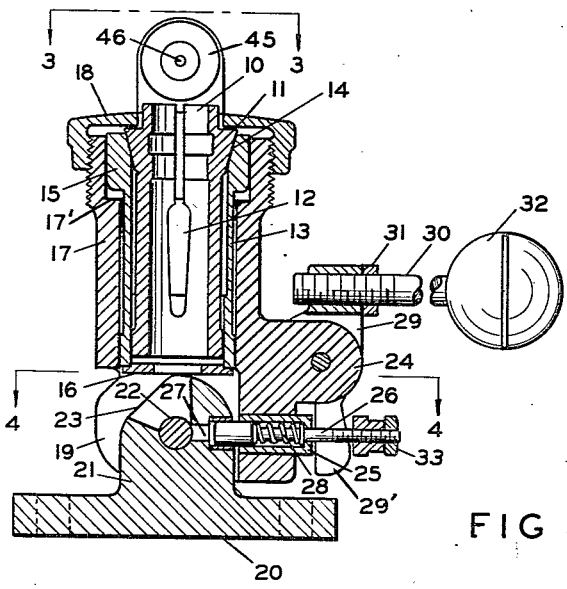
Fig. 2 is a cross-sectional view of the work holding and tilting device illustrated in Fig. 1.
Figure 4:
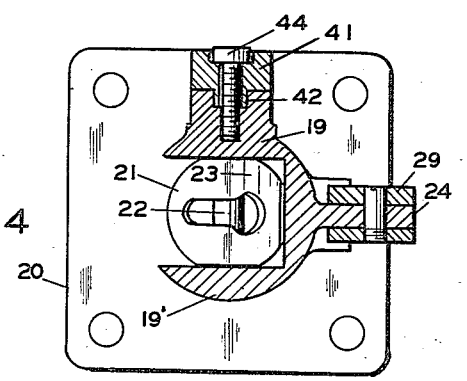
Fig. 4 is a cross-sectional view taken along line 4—4 in Fig. 2.

Referring now in detail to the embodiment chosen for purpose of illustration, a work holding member such as collet 10 is of tubular design and is provided with an integral peripheral flange 11 adjacent its upper end, which flange tapers toward the center of the collet. Three or more spaced longitudinal slits 12, which start at the upper end of collet 10 and terminate near the other end thereof, divide collet 10 into jaws, and divide peripheral flange 11 into flange segments fixed to these jaws. As seen in Figs. 2 and 3, collet 10 is slidably mounted within a sleeve 13 with the tapered portion of peripheral flange 11 abutting an internally bevelled portion 14 formed at one end of sleeve 13. Therefore, if collet 10 is urged further within sleeve 13, the camming action between the bevelled portion 14 and the segments of peripheral flange 11 will cause the jaws of collet 10 to close, thus reducing the diameter of the opening of collet 10 to clamp a piece of work therein. On the other hand, the resiliency of collet 10 is such that upon release of the force urging collet 10 within sleeve 14, the collet will again assume its normal open position. For purposes to be described later, sleeve 13 is provided with a peripheral flange 15 adjacent its bevelled end, and has a friction plate 16 across its lower end.

The above described work clamping assembly is enclosed in a closure member comprising a tubular casing 17 slidably journaling sleeve 13, and a cap 18 through which the upper end of collet 10 projects. The clamping assembly is thus free to move a limited distance within the closure member; however, upward movement of the clamping assembly is limited by cap 18 acting against peripheral flange 11, while downward movement of the clamping assembly is limited by an internal shoulder 17' within casing 17 for abutting flange 15. Cap 18 threadably engages the upper end of casing 17 so that the upward limit of movement of collet 10 may be adjusted by rotation of this cap.

By arms 19, 19' which depend from casing 17, the closure member is pivotally connected to a base assembly which comprises a flat base 20 and an upstanding sleeve actuating mound 21 formed integrally therewith. A lateral shaft 22, which is mounted between arms 19, 19', extends through and is journaled in a horizontally drilled hole in mound 21 so that plate 16 will ride against an irregular-shaped arcuate camming surface 23 on mound 21 as casing 17 is tilted.

As seen more clearly in Fig. 2, camming surface 23 is somewhat concentrically arranged with respect to shaft 22, however, the vertical radius of camming surface 23 is substantially greater than the diagonal radius and therefore when the closure member is in the upright position, sleeve 13 is urged upwardly as shown in Fig. 2. With the collet fixture in the tilted position, as shown by broken lines in Figs. 1 and 5, the radius of the camming surface 23 acting against sleeve 13 is reduced, and hence, if collet 10 is closed, sleeve 13 will be urged downwardly as the closure member is tilted, to thus allow the collet to open.

Projecting laterally from the lower portion of casing 17 and at right angles to shaft 22 is a lever supporting arm 24, the lower portion of which is drilled to receive a plunger supporting bushing 25 slidably journaling a plunger 26. With the collet tilting fixture in the upright position as shown by full lines in Figs. 1, 2 and 5, plunger 26 is aligned with an aperture 27 in mound 21 and is urged therein by a spring 28 within bushing 25. To withdraw plunger 26 from aperture 27, and also to tilt the closure member, a lever 29 is pivotally mounted on lever supporting arm 24 so that the yoke 29' formed at the lower end of this lever will straddle the projecting end of plunger 26. The upper end of lever 29 is provided with an outwardly projecting lever arm 30 which also contains a lock nut 31 and a knob handle 32. To cooperate with the yoke of lever 29, the projecting end of plunger 26 is provided with a threadably adjustable nut 33, against which the yoke acts as lever 29 is pivoted.

From the foregoing description, it will be apparent that as knob handle 32 is lifted, lever 29 will pivot so that the lower end thereof will act against nut 33 and withdraw plunger 26 from aperture 27 while compressing spring 28. With additional lifting of knob handle 32, the closure member will be rotated about the shaft 22; thus sleeve 13, riding on camming surface 23, will move downwardly to allow the jaws of collet 10 to open. With the jaws of collet 10 open, the work retained thereby may be removed and another piece of work inserted; then, by downward force on knob handle 32, the closure member may be returned to its original upright position. As the closure member approaches this upright position, sleeve 13 is again urged upwardly as it rides upon camming surface 23; hence, by camming action against the segments of peripheral flange 11, the jaws of collet 10 are caused to clamp the work and retain it. It should be remembered that to further close or open the jaws of collet 10 when the collet tilting fixture is in its vertical position, cap 18 may be rotated to act against the top of peripheral flange 11 either urging collet 10 downwardly or allowing it to move upwardly within sleeve 13.

Figure 5:
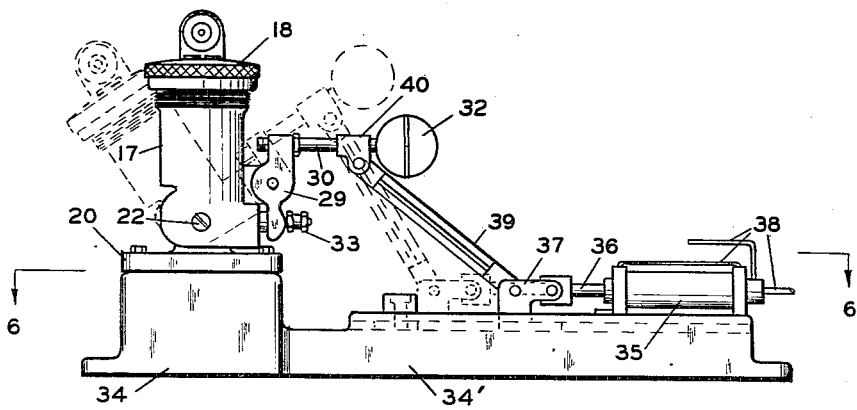
Fig. 5 is a side elevation of the work holding and tilting device illustrated in Fig. 1, said device being in combination with a hydraulic actuator mechanism for automatic tilting.
Figure 6:
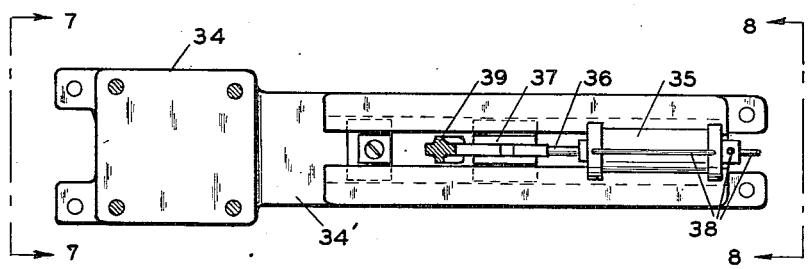
Fig. 6 is a horizontal sectional view taken along lines 6—6 of Fig. 5.
Figure 7:
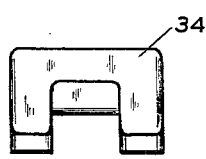
Fig. 7 is an end view taken along lines 7—7 of Fig. 6.
Figure 8:
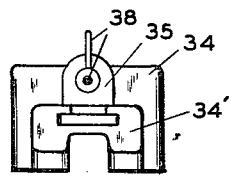
Fig. 8 is an end view taken along lines 8—8 of Fig. 6.

In Fig. 5, the work holding and tilting device described above is shown, according to my invention, in combination with the hydraulic actuator mechanism, details of which are shown in Figs. 6, 7 and 8. In these figures, the work holding and tilting device is shown bolted to a platform 34 formed integrally with a cylinder supporting base 34'. A cylinder 35 is mounted on base 34' in a plane below lever arm 30 and in spaced relation with respect to the work holding and tilting device. This cylinder contains a double-acting piston (not shown) provided with a piston rod 36. The end of piston rod 36 is connected to a crosshead 37 which is slidably retained in base 34'. Hydraulic fluid may be introduced, according to prior art methods, through pipes 38 to one or the other side of the piston (not shown) within cylinder 35 and can move crosshead 37 horizontally from the position shown by solid lines in Fig. 5 to the position shown by the broken lines, and vice versa. A rigid connecting rod 39 is pivotally connected to crosshead 37 and extends diagonally up to lever arm 30 and terminates by being pivotally connected to an adjustable clamp 40 fixed to lever arm 30 adjacent knob handle 32.

It should be noted therefore that, when hydraulic fluid is introduced on one side of the piston to bring crosshead 37 to the position shown by solid lines in Fig. 5, lever arm 30 is pulled downwardly and hence the collet tilting fixture is thereby positioned in a vertical or clamping position. On the other hand, if hydraulic fluid is introduced on the other side of the piston, the crosshead 37 will be moved to the left in Fig. 1 and hence lever 30 will be lifted, thus tilting the closure member to a position shown by broken lines in Fig. 1.

Figure 1:
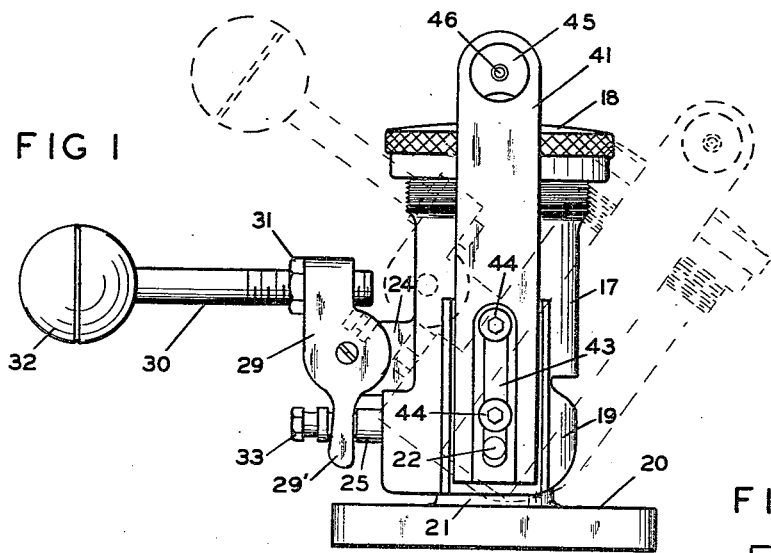
Fig. 1 is a side elevation of a work holding and tilting device constructed in accordance with my invention.

In the event that my work holding and tilting device, either with or without the hydraulic actuator mechanism, is used to support work for transverse tapping or drilling, it may be desirable to use a drill guide as seen in Figs. 1 through 5. This drill guide comprises a vertically disposed standard 41 received within a vertically milled, slotted section 42, along one side of casing 17. Standard 41 is provided at its lower end with an elongated slot 43 through which a pair of spaced cap screws 44 pass to threadably engage the closure member and thereby allow the position of standard 41 to be adjusted vertically. The upper end of standard 41 terminates above cap 18 and its upper end threadably retains a laterally disposed drill guiding member 45 which is provided with an axial aperture 46 through which a drill may project. Drill guiding member 45 is substantially cylindrical in shape and as seen in Figs. 1, 2 and 3, is of sufficient length to insure that a drill passed through aperture 46 will not wobble or deviate as it is passed into or through the work clamped by collet 10. It should be remembered that if a different size drill is used, a drill guiding member 45 having a different size aperture 46 should be substituted for the drill guiding member shown. Further, if it is desired to make a horizontal hole in a position vertically parallel to the hole originally made in the piece of work, bolts 44 should be loosened so that standard 41 may then be raised or lowered as desired. With drill guiding member 45 relocated vertically by movement of standard 41, bolts 44 should be tightened.

It will be apparent from the foregoing description that when it is desired to use my work holding and tilting device for center tapping or center drilling a piece of work, base 20 is positioned on the work plate or bench of a drill press or the like, and retained thereon by any convenient means so that the vertical axis thereof is aligned with the vertical axis of the drilling chuck or bit. The closure member is next tilted and a piece of work inserted in collet 10; the closure member is then returned to the vertical position and cap 18 adjusted for proper clamping of the work. The drill contained in the chuck or bit may then be passed into or through the work, as desired, and withdrawn or retracted. Thereafter, the fixture may be tilted and the cycle repeated. It should be remembered that since my work holding and tilting device rotates the work from alignment with the drill, it enables the retracting movement of the drill to be reduced in amplitude since it is not necessary to clear the drill a great distance from the finished work in order to remove the work from collet 10.

It will be obvious to those skilled in the art that many variations may be made in the embodiment chosen for purpose of illustration without departing from the scope of my invention as defined by the following claim.

I claim:

A device of the class described comprising, a base, a tubular closure member pivotally mounted on said base for movement from a normal position to a tilted position, a collet mounted for limited free movement within said closure member, a collet operating member within said closure member and surrounding said collet and selectively engageable therewith for closing said collet, and cam means connected to said base for engagement with said collet operating member actuating said collet operating member upon the pivoting of said closure member, said last mentioned means being operable to close said collet when said closure member is in said normal position and allow said collet to pen when said closure member is in said tilted position.

References Cited in the file of this patent

UNITED STATES PATENTS

| | | |
|---|---|---|
| 642,235 | Knape | Jan. 30, 1900 |
| 2,549,606 | Hudson | Apr. 17, 1951 |
| 2,660,006 | Hegeman | Nov. 24, 1953 |